United States Patent
Hamilton et al.

(10) Patent No.: US 12,443,556 B2
(45) Date of Patent: Oct. 14, 2025

(54) PCI FLOW CONTROL WITH SIGNAL INTERCEPTION

(71) Applicant: Arm Limited, Cambridge (GB)

(72) Inventors: Travis Bailey Hamilton, Cedar Park, TX (US); Charles Andrew Giefer, Austin, TX (US)

(73) Assignee: Arm Limited, Cambridge (GB)

( * ) Notice: Subject to any disclaimer, the term of this patent is extended or adjusted under 35 U.S.C. 154(b) by 73 days.

(21) Appl. No.: 18/446,107

(22) Filed: Aug. 8, 2023

(65) Prior Publication Data

US 2025/0053534 A1  Feb. 13, 2025

(51) Int. Cl.
  *G06F 13/42* (2006.01)

(52) U.S. Cl.
  CPC .. *G06F 13/4221* (2013.01); *G06F 2213/0024* (2013.01)

(58) Field of Classification Search
  CPC .................... G06F 13/4221; G06F 2213/0024
  USPC ......... 710/5, 6, 15, 19, 29, 33, 58, 104, 107
  See application file for complete search history.

(56) References Cited

U.S. PATENT DOCUMENTS

| | | | | |
|---|---|---|---|---|
| 4,804,938 A * | 2/1989 | Rouse | ............... | H02J 13/00028 375/259 |
| 6,424,954 B1 * | 7/2002 | Leon | ................. | G07B 17/0008 705/401 |
| 7,945,721 B1 * | 5/2011 | Johnsen | ................ | G06F 13/385 710/10 |
| 8,410,994 B1 * | 4/2013 | Testa | ......................... | G06F 3/14 345/1.3 |
| 2003/0079075 A1 * | 4/2003 | Asseline | ............. | G06F 13/4027 710/315 |
| 2004/0133727 A1 * | 7/2004 | Scordalakes | ........ | G06F 13/4081 710/305 |
| 2012/0311221 A1 * | 12/2012 | Freking | ............... | G06F 13/4081 710/313 |
| 2013/0191631 A1 * | 7/2013 | Ylonen | ................ | H04L 63/164 713/153 |
| 2015/0081979 A1 * | 3/2015 | Banta | .................. | G06F 12/0804 711/143 |

* cited by examiner

*Primary Examiner* — Tim T Vo
*Assistant Examiner* — Henry W Yu
(74) *Attorney, Agent, or Firm* — NIXON & VANDERHYE P.C.

(57) ABSTRACT

A data processing apparatus includes interception circuitry for intercepting an incoming signal corresponding to an instruction from a processor element to a PCI device. Respond circuitry provides a response to the incoming signal back to the processor element and the response is either an acceptance of the incoming signal or a refusal of the incoming signal based on a flow control between the data processing apparatus and the PCI device. Forward circuitry performs a transmission, to the PCI device, of an outgoing signal corresponding to the command after the response has indicated acceptance of the incoming signal.

15 Claims, 5 Drawing Sheets

PCI FLOW CONTROL WITH SIGNAL INTERCEPTION

TECHNICAL FIELD

The present disclosure relates to data processing.

DESCRIPTION

It is often desirable for a processor element to send data or commands to PCI devices. This can be achieved using a store with return instruction that targets a memory location associated with the PCI device for instance. The round-trip delay for off-chip communications (e.g. to PCI devices) can be large, e.g. of the order of hundreds of nanoseconds. This is not in and of itself necessarily problematic. However, processor elements can impose tight restrictions on the number of store with return instructions that can be in-flight at any particular moment. Coupled with the large round-trip delay, this can severely restrict the amount of bandwidth that is available for sending data and commands to PCI devices.

SUMMARY

Viewed from a first example configuration, there is provided a data processing apparatus comprising: interception circuitry configured to intercept an incoming signal corresponding to an instruction from a processor element to a PCI device; respond circuitry configured to provide a response to the incoming signal back to the processor element, wherein the response is either an acceptance of the incoming signal or a refusal of the incoming signal based on a flow control between the data processing apparatus and the PCI device; and forward circuitry configured to perform a transmission, to the PCI device, of an outgoing signal corresponding to the command after the response has indicated acceptance of the incoming signal.

Viewed from a second example configuration, there is provided a method of data processing comprising: intercepting an incoming signal corresponding to an instruction from a processor element to a PCI device; providing a response to the incoming signal back to the processor element, wherein the response is either an acceptance of the incoming signal or a refusal of the incoming signal based on a flow control between the data processing apparatus and the PCI device; and performing a transmission, to the PCI device, of an outgoing signal corresponding to the command after the response has indicated acceptance of the incoming signal.

Viewed from a third example configuration, there is provided a non-transitory computer-readable medium to store computer-readable code for fabrication of a data processing apparatus comprising: interception circuitry configured to intercept an incoming signal corresponding to an instruction from a processor element to a PCI device; respond circuitry configured to provide a response to the incoming signal back to the processor element, wherein the response is either an acceptance of the incoming signal or a refusal of the incoming signal based on a flow control between the data processing apparatus and the PCI device; and forward circuitry configured to perform a transmission, to the PCI device, of an outgoing signal corresponding to the command after the response has indicated acceptance of the incoming signal.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
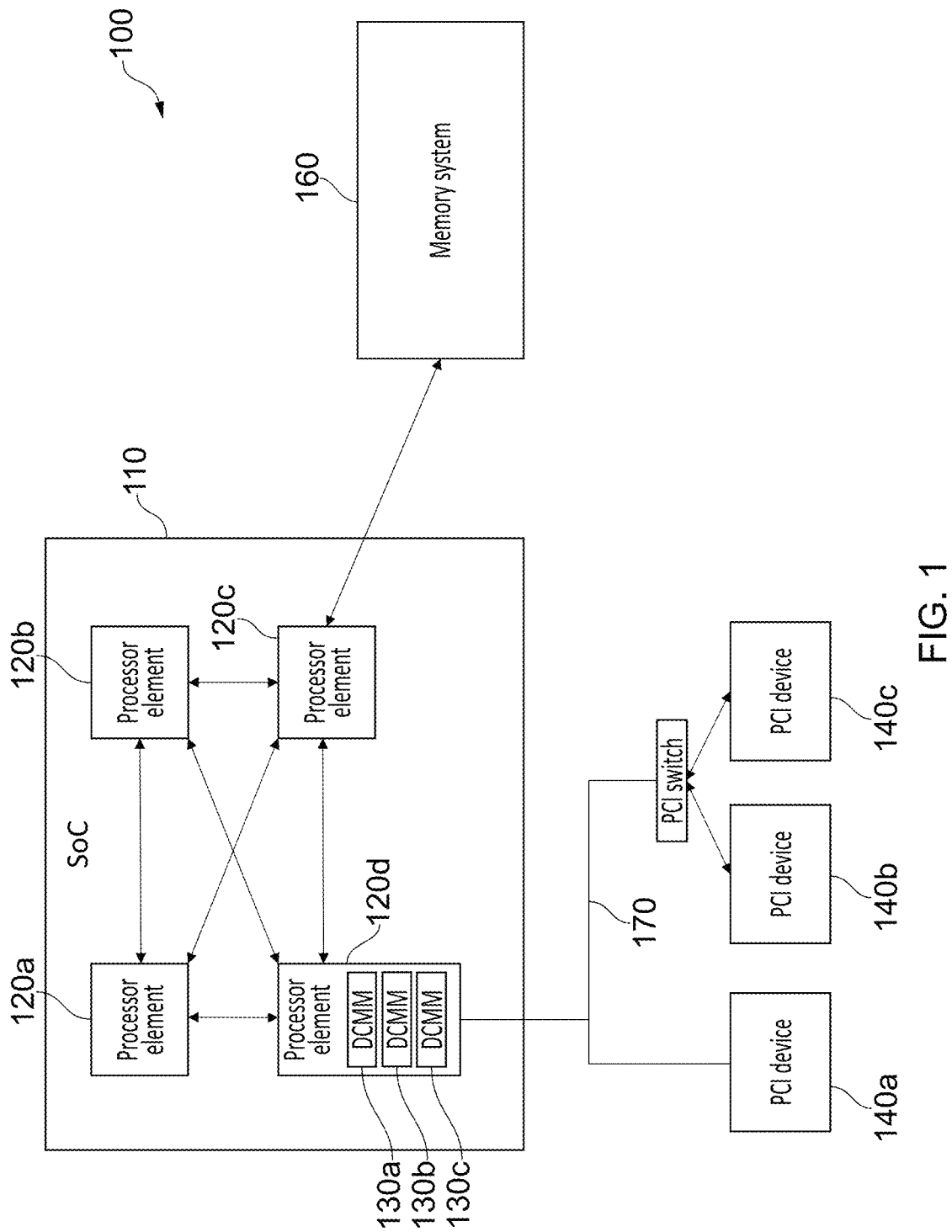
FIG. 1 illustrates an example system.

Before discussing the embodiments with reference to the accompanying figures, the following description of embodiments is provided.

In accordance with one example configuration there is provided a data processing apparatus comprising: interception circuitry configured to intercept an incoming signal corresponding to an instruction from a processor element to a PCI device; respond circuitry configured to provide a response to the incoming signal back to the processor element, wherein the response is either an acceptance of the incoming signal or a refusal of the incoming signal based on a flow control between the data processing apparatus and the PCI device; and forward circuitry configured to perform a transmission, to the PCI device, of an outgoing signal corresponding to the command after the response has indicated acceptance of the incoming signal.

The above technique makes it possible for processor elements to increase bandwidth usage without increasing the number of in-flight instructions that they issue. In particular, this is achieved by reducing the round-trip delay so that each instruction is in-flight for less time and so more instructions can be issued over a particular period of time. The present technique achieves this by receiving an incoming signal and responding to that incoming signal with either an acceptance or a refusal. Which of these is selected is based on a flow control that exists between the data processing apparatus and the PCI device. That is to say that in some respects, the data processing apparatus acts as a 'proxy' for the PCI device and allows acceptance or refusal to occur at an earlier point in time that would be achieved if the instruction was sent all the way to the PCI device itself. If acceptance of the instruction occurs, then the instruction is forwarded to the PCI device. If the instruction is rejected then it is not forwarded to the PCI device. Note that the term 'PCI' device is intended to encapsulate traditional PCI devices as well as PCIe devices and other specialised PCI devices for example.

In some examples, the interception circuitry comprises receive circuitry to receive the incoming signal. The interception circuitry can therefore receive a signal/instruction by the fact that it passes through the data processing apparatus on the way to the PCI device. This may be because, for instance, the data processing apparatus acts as a gateway to the PCI devices, such as sitting on a PCI bus.

In some examples, the interception circuitry is configured to intercept the incoming signal based on a destination of the incoming signal. The interception circuitry can determine whether a particular signal is relevant (e.g. whether it is for an instruction to be forwarded to a PCI device) based on a destination of the instruction. The destination can take a number of forms, but in some examples, the destination is a location at which an operation is to be performed.

In some examples, the data processing apparatus comprises: address range storage circuitry configured to indicate one or more memory ranges used to address the PCI device; and the interception circuitry is configured to intercept the incoming signal in dependence on whether a destination address of the command falls within the one or more memory ranges. The instruction could indicate a particular memory address that is used to address a PCI device, with each PCI device having a range of memory addresses to which that device can be addressed. If the address specified in the instruction falls within the range specified for a PCI device then the interception circuitry can intercept the instruction. Rather than directly allowing the instruction to be forwarded to the PCI device (in either its original form or its converted form) further decision making may take place as to whether the instruction should be allowed to continue or not. The range of addresses for the PCI device can be stored within the address range storage circuitry.

In some examples, the address range storage circuitry is configured to store, in association with each of the one or more memory ranges, an indication of whether the control flow applies. Consequently, different parts of the memory range associated with a PCI device can have control flow disabled (or enabled) as desired. This makes it possible for particular memory addresses to be accessed regardless of the flow control mechanism. In situations where no control flow applies, the incoming signal/instruction is responded to with an ACK as if the control flow itself accepted it.

In some examples, the address range storage circuitry is configured to store, in association with each of the one or more memory ranges, an indication of whether the control flow applies for the processor element. This allows a finer grain control over the extent to which flow control can be applied by allowing some origins (processor elements) to be exempt from flow control or to have flow control always applied as appropriate.

In some examples, the interception circuitry is configured to receive a plurality of incoming signals corresponding to commands from a plurality of processor elements, including the incoming signal corresponding to the command from the processor element; and the plurality of processor elements are connected in a mesh together with the data processing apparatus.

In some examples, the control flow defines a permitted flow for each of a plurality of PCI devices including the PCI device. The permitted flow could take the form of a number of credits in a credit based system, or could be a guaranteed bandwidth that is available on, e.g. a PCI bus, for a particular PCI device. Other forms of flow control are of course possible.

In some examples, the respond circuitry is configured, in response to the flow control indicating that a maximum flow for the PCI device has been reached, to respond to the command with a NACK. A NACK or non-acknowledgement can be used to indicate the refusal or non acceptance of a message or instruction. In this instance, the NACK indicates that the instruction that was bound for the PCI device has been refused. The processor element can respond to this by reissuing the instruction, raising an error (e.g. an exception) or taking some other action. In case of reissuing, some delay may be encountered before the instruction can be re-issued.

In some examples, the flow control is a credit based mechanism. A credit based mechanism sees a number of credits removed from a pool as a consequence of the resource (e.g. the bandwidth) being used up. When the credit pool is low, a request for further credits can be made, which may be provided if more of the resource is available. Otherwise the request may be denied. When the pool of credits is exhausted, further resource usage is denied (which may result in a NACK at the data processing apparatus as explained above).

In some examples, the respond circuitry is configured to provide the response to the incoming signal back to the processor element prior to the transmission occurring. Thus, the decision of whether to provide the response (and what response to provide) occurs before the instruction is forwarded to its destination (e.g. the PCI device). In this way, the data processing apparatus is essentially acting as a proxy for the PCI device as to whether the request should be accepted or not.

In some examples, the respond circuitry is configured to provide the response in the form of an acknowledgement to the incoming signal back to the processor element prior to the transmission occurring, when a maximum flow for the PCI device is not reached. In these examples, if the data processing apparatus (acting as a 'proxy') is able to accept the instruction—meaning that sufficient resource exists and can be used—then an acknowledgement is sent back to the originating processor element. Note that this acknowledgement is sent before the transmission occurs such that the data processing apparatus is acting as a proxy for the PCI device.

Particular embodiments will now be described with reference to the figures.

FIG. 1 shows an example system 100 containing a system-on-chip 110. The system-on-chip is made up of a number of processor elements 120*a*, 120*b*, 120*c*, 120*d* arranged in a mesh such that each processor element 120*a*, 120*b*, 120*c*, 120*d* can communicate with each other processor element 120*a*. 120*b*, 120*c*, 120*d*. In this mesh configuration (which may be different in other systems-on-chips), a round-trip delay for a communication from one processor element 120*a* to another 120*d* may be of the order of 50 ns.

The system 100 also incudes a memory system 160, which may be made up from one or more caches and a main backing memory (e.g a DRAM). The memory can be accessed by any of the processor elements 120*a*, 120*b*, 120*c*, 120*d* through, in this example, one specific processor element 120*c*.

A number of PCI or PCI devices 140*a*, 140*b*, 140*c* (herein simply described as a PCI device) also exist some of which, in this example, are connected to the system-on-chip 110 via a PCI switch. The PCI devices 140*a*, 140*b*, 140*c* communicate with the processor elements 120, 120*b*, 120*c*, 120*d* via a bus 170 to a specific one of the processor elements 120*d*. Communication with the PCI devices 140*a*. 140*b*, 140*c* can be comparatively slow with a communication from one of the non-directly connected processor elements 120*a* requiring of the order of 500 ns for a round-trip communication. There are a number of ways that such communication can be achieved, but in some examples this is achieved by using a store with return instruction to store the contents of a register at a memory address owned by (i.e. used to address) the corresponding PCI device. However, each processor element may only be permitted to have a number of such instructions 'in flight' at any time. When only a small number of instructions can be in-flight, the long round-trip delay time means that the bandwidth on the PCI bus 170.

The bandwidth can be increased by allowing an increase in the number of such instructions that can be in-flight at a time. However, to completely saturate the bandwidth for a link with such a high latency (round-trip delay) would require a capacity to store an enormous number of in-flight instructions at once. This comes at the cost of power efficiency and circuit size since when data (including commands) is not being sent to the PCI devices, the circuitry used to store in-flight instructions may be going unused, leading to high power consumption.

The present examples solve this problem by the presence of one or more DCMMs (Device Credit Management Mechanisms). One DCMM 130a is provided for each bridge, with the DCMM 130a supporting the downstream PCI devices 140a, 140b, 140c on that bridge and is provided at the processor element 120d to which the bridge is connected. Note that although this example shows two further DCMMs 130b, 130c the corresponding bridges are not shown. In practice, the DCMM can lie anywhere between that processor element 120d and a point of serialisation (e.g. a point beyond which ordering of requests adheres to PCI ordering requirements). Past the point of serialisation, the PCI ordering rules may be violated and this can cause problems. It will also be appreciated that the functionality of multiple DCMMs could also be combined with each other and/or with the encapsulating processor element 120d.

The DCMM 130a for a given bridge can act as a 'proxy' for the PCI devices 140a, 140b, 140c on that bridge. In this way, a store with return request to write data to the PCI device 140a can be intercepted by the DCMM 130a and the request can be accepted or rejected as appropriate. In either case, an appropriate message can be sent back to the originating processor element 120. Consequently, the round-trip delay time can be reduced from of the order of 500 ns to of the order of 50 ns. This allows a larger number of instructions to be in-flight at any time from a given processor element 120a, which therefore enables the bandwidth between the processor element 120d and the PCI devices 140a, 140b, 140c to be better saturated. The DCMM 130a takes care of buffering and 'forwarding' the data received from the processor element 120a in accordance with a flow control mechanism so that the bandwidth is kept under control and, where appropriate, distributed fairly among the processor elements 120a, 120b, 120c. 120d and/or the PCI devices 140a, 140b, 140c.

Figure 2:
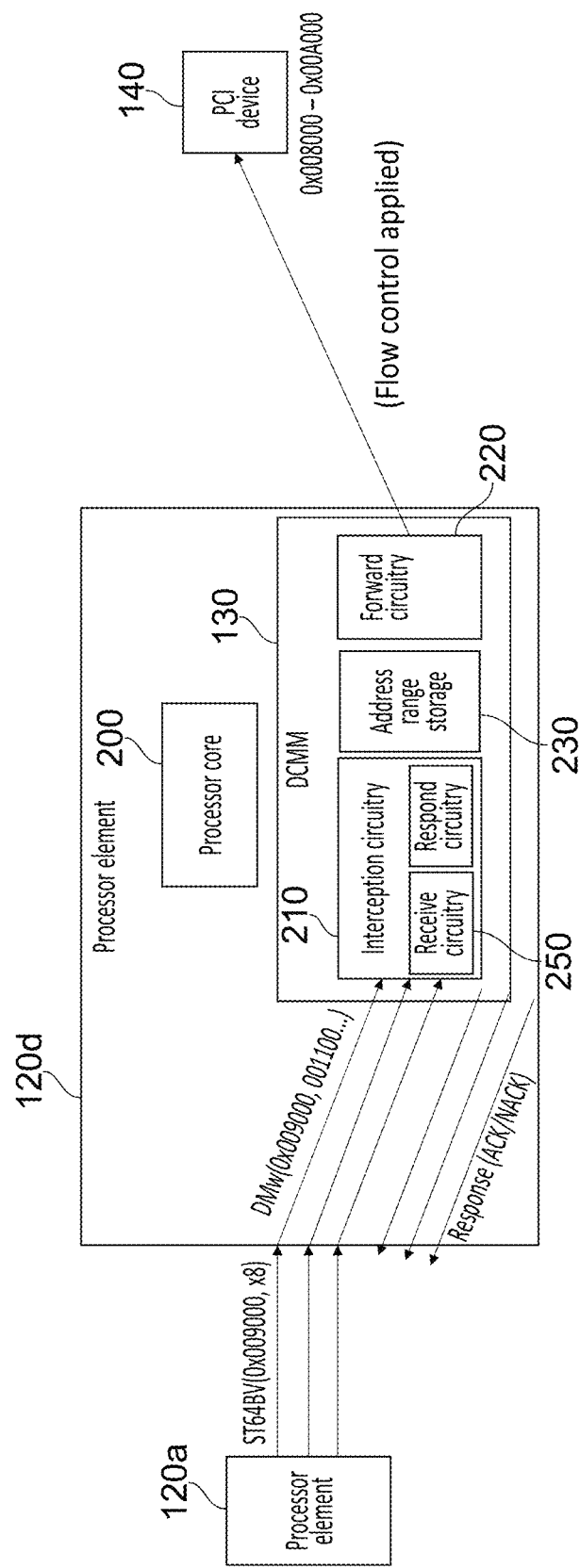
FIG. 2 illustrates a processor element containing a DCMM, which is one example of the claimed apparatus.

FIG. 2 illustrates the processor element 120d in more detail. FIG. 2 illustrates the reception of a store with return instruction (which may involve writing or reading data such as a command) in the form of an ST64BV instruction containing a memory location and a register address. Of course, other instructions can also be used (and indeed, in some examples the ST64BV instruction may be translated to another instruction type on route to the DCMM 130a). In this example, the store with return instruction directs a store of data in a register (x8) to a memory location (0x009000) that is mapped to a particular PCI device 140 (the PCI device 140 is mapped to memory locations 0x008000-0x00A000). The instruction is translated (either by the DCMM 130 itself or by another entity prior to arriving at the DCMM 130) to a Deferrable Memory Write (DMwr) instruction that takes the same memory location (0x009000) and the contents of the specified register (x8), and causes a write to a location off-chip 110.

As explained above, this example uses ST64BV as an example of a store with return instruction and the ST64BV instruction might be translated on route. Other examples may use a single type store with return instruction for the entire flow.

The processor element 120d contains a processor core 200, which can be used for general purpose processing. The DCMM 130 within the processor element 120d is also illustrated. In this example, the DCMM 130 contains interception circuitry 210, which contains receive circuitry 250. Collectively, these circuits 210, 250 are able to intercept the DMw instruction and note that it is directed to a memory location that is handled by a PCI device 140. A decision is then made as to the extent to which flow control is applied. This is achieved using the address range storage 230. In particular, certain sub-ranges of the memory handed by the PCI device 140 may be exempt from flow control or may have additional flow control applied. The application of flow control may require the DMw instruction to be temporarily buffered—for instance, if only a certain number of instructions can be issued in a given period. Finally, forward circuitry 220 transmits the DMw instruction to the PCI device 140 in accordance with any required flow control that is to be applied to the instruction.

Figure 3:
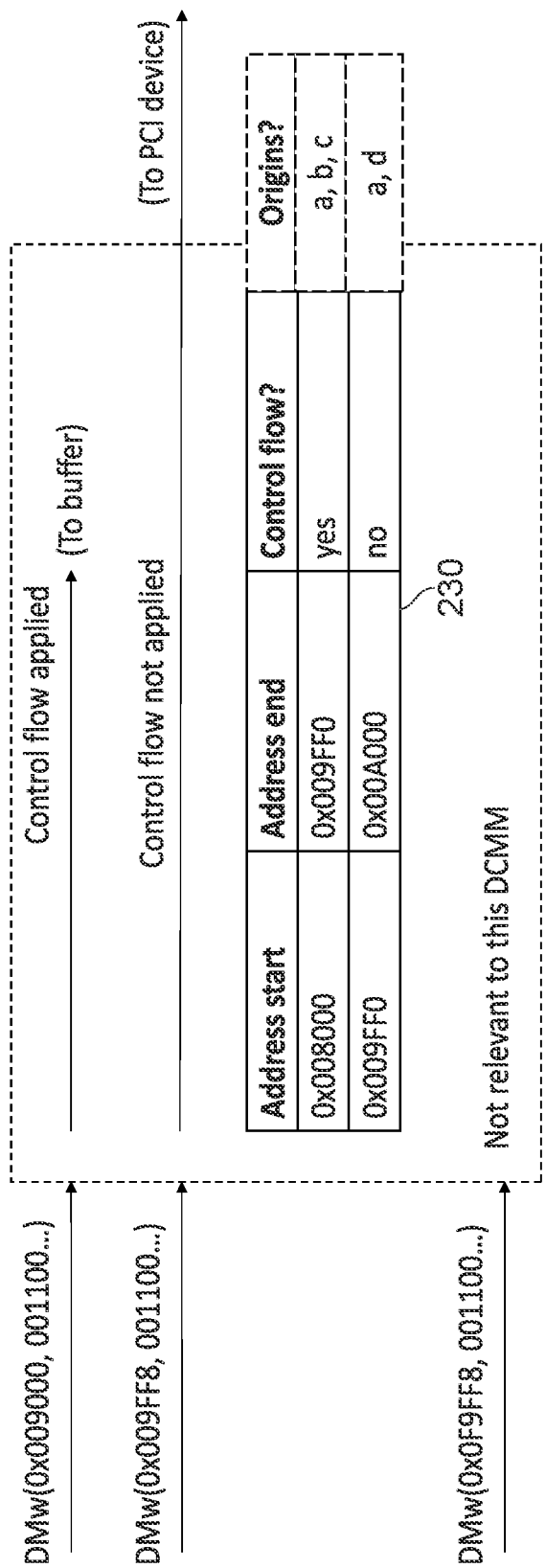
FIG. 3 shows the behaviour of flow control rules that can be applied.

Note that this example illustrates the behaviour of the processor element 120d on receiving data for a PCI device 140 from another processor element 120a. However, the same technique is equally applicable for the transmission of data generated by the processor core 200 of a single processor element 120d. In this example, the ST64BV may be internally converted to the DMw instruction that is handled by the DCMM 130. FIG. 3 illustrates an example of what may be stored within the address range storage circuitry 230. Here, the table indicates a start address and an end address for a given PCI device. The table also indicates whether control flow is provided for that address range. In some examples that use a credit or counter based system, the table 230 could also indicate the current count or current number of credits that are available for handling data in that address range.

In this example, the PCI device is addressable through memory addresses 0x008000 to 0x000A000. Any instruction receives that accesses one of those addresses is intercepted by the interception circuitry 210/receive circuitry 250. The specific address is then assessed to determine whether control flow should be applied (and to what extent). In this example, data that is addressed within the range 0x008000-0x009FF0 do have control flow applied whereas data that is addressed to the range 0x009FF0-0x00A000 does not have control flow applied. This can be used to set aside an area that can be used for high throughput, which might be used for 'urgent' or 'high priority' traffic. Note that in these situations, such messages may or may not (depending on the implementation) be counted against the overall bandwidth available. For example, in some embodiments, even when control flow is not applied, the amount of bandwidth available for messages that address the PCI device 140 could still be reduced.

FIG. 3 therefore shows three examples of instructions. A first instruction that targets address 0x009000 falls within the first control flow range and so control flow is applied. This may necessitate the instruction being deferred (refused/returned) until the control flow permits the data to proceed (e.g. if no credits are available). A second instruction targets the address 0x009FF8. This falls within the second control flow range, to which control flow is not applied. This instruction can therefore proceed immediately (although the instruction could still be stored in a buffer until the next transmission takes place). In the third case, the instruction targets an address 0x0F9FF8. This address falls outside the range of addresses that are handled by the PCI device 140. Consequently, this DCMM 130 does not handle the message. The message may be handled by another DCMM 130 (which can be directed to another PCI device).

FIG. 3 also shows an optional extra column that dictates whether the control flow column applies for a particular origin or not. That is to say that the issue of whether control flow applies or not (as specified in the control flow column) applies only if the origin is one of the origins specified in the optional origins column. If not, the opposite situation applies. Therefore in the case of the address range 0x008000-0x009FF0, the control flow applies where the origin is one of devices 120a, 120b, or 120c. Otherwise no control flow applies. Similarly for the range 0x009FF0-0x00A000, no control flow applies where the origin is one of 120a, 120d. Otherwise control flow does apply for that range. In some other examples, rather than a simple binary yes/no, the address range storage circuitry 230 may indicate the extent to which control flow applies. For instance, in a credit based system, the number of credits available to a PCI device 140 may be split between different origins (processor elements). Other flow control techniques are also applicable.

Depending on the implementation, if none of the DCMMs 130 handle the instruction, the instruction could be disregarded or could be refused (e.g. via a NACK) to the origin.

Figure 4:
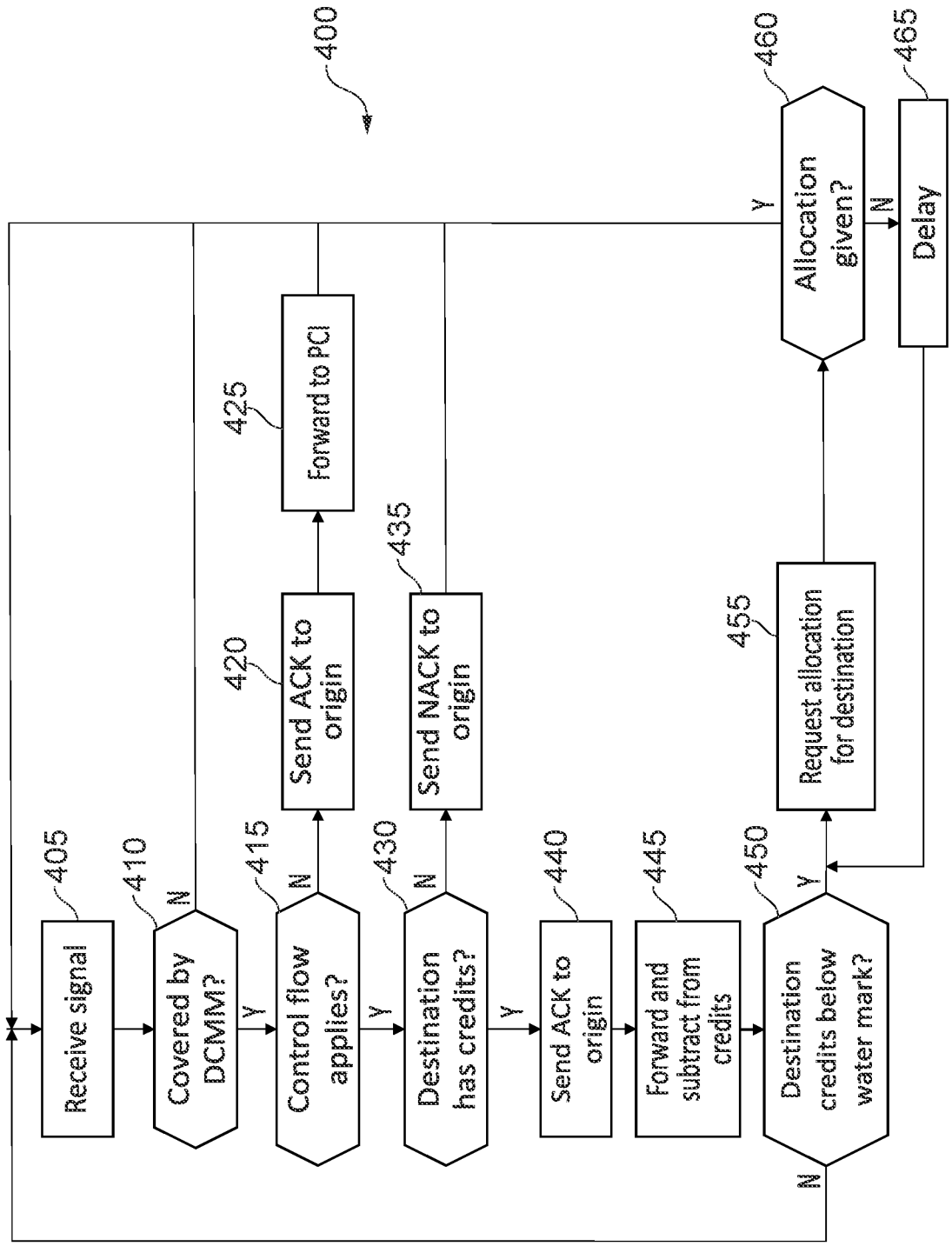
FIG. 4 is of a flow chart that shows the communications that may be used by the processor element.

FIG. 4 shows a flow chart 400 that illustrates the mechanism that can be performed by the DCMM 130 for receiving an instruction and for applying flow control. In this example, a credit control mechanism is used to provide credits' to each PCI device that is accessible via the bus 170. The credits represent an amount of the bandwidth that can be used by each of the accessible PCI devices 140 and helps to ensure that no one device unfairly uses all of the available bandwidth. Of course, the number of credits, the method of refresh and methods for handling unused credits are largely irrelevant to the present invention and therefore beyond the scope of this disclosure. Suffice to say that when the credits are exhausted, a request for more can be made, which may be accepted or rejected based on the available bandwidth on the bus 170 at that moment in time.

The flow begins at a step 405 where a signal is received at the interception circuitry 210. The signal in this example corresponds with an instruction to write data to a particular memory location. At a step 410, it is determined whether the memory location is one that falls under the purview of any of the DCMMs 130. That is, whether the location falls within the addressable ranges belonging to the PCI device(s) 140 for which the DCMM 130 is responsible. If not, then the process returns to step 405. The instruction may be considered by other DCMMs 130 that may be present. If no DCMM is responsible for the address being used then either the instruction may be ignored, or an error may be returned to the origin of the instruction depending on the implementation.

If, at step 410, the DCMM does cover the address then at step 415 it is determined whether or not a control flow applies for the given address. An example of this is illustrated in FIG. 3. If no control flow applies at step 415, then an ACK of the instruction is sent back to the origin at step 420. The instruction is then buffered (as appropriate) and forwarded to the destination at step 425 before the process returns to step 405. No flow control occurs in this, which is to say that the instruction is applied at a next opportunity.

If control flow does apply at step 415, then it is determined whether the destination has any credits remaining at step 430. If not, then a NACK is sent to the origin to indicate that the instruction could not be followed. The process then returns to step 405.

If the destination does have credits at step 430 then an ACK is sent to the origin of the instruction at step 440. Then at step 445, the instruction is buffered (if appropriate) and forwarded to the PCI device 140. In addition the number of credits assigned to the destination are decremented (e.g. by one). The buffering could be short term, since the instruction may be acted on at the next opportunity. Then, at step 450, it is determined whether the number of credits for the destination is below a water mark. This could be defined as, for instance, 5% of the maximum number of credits that can be held. If the number of credits is not below the water mark then the process returns to step 405. Otherwise, the process proceeds to step 455 where a new allocation of credits may be given. In this example, the allocation can be made by the PCI device 140 itself, which can judge the bandwidth level of the bus 170.

St step 460, it is determined whether a new allocation is given. If so, the process simply returns to step 405. If not, then a short delay occurs at step 465 before another request for credits is made at step 455. The delay itself is optional, but can help to reduce bandwidth overuse by continual requests for additional credits. The algorithm used to establish the delay can be more or less anything. In some embodiments, the delay is exponential so that each time the request for credits fails, the amount of time the delay occurs for is doubled.

Note that in this example, the credit request mechanism is serialised within the flow. In practice, this process may be carried out in parallel so that a delay in requesting credits does not impact the ability for the device to handle incoming instructions/signals.

The selection of the water mark can influence how aggressively the system requests new credits. When this value is high, requests for top ups are made frequently, which can increase bandwidth. However, when the value is high, the number of credits may get so low that NACKs will be sent back to origins due to an absence of credits waiting for a top up. Ideally, the water mark should be sufficiently high so that in typical use, there will be a sufficient number of credits to handle incoming requests until such time as the request for allocation can be responded to (at least once).

In this example, credits are allocated to downstream (PCI) devices. However, in other embodiments, credits could be allocated to origin devices so that no origin/processor device 120a, 120b, 120c, 120d can unfairly overuse the bandwidth.

In general, the behaviour of the processor elements need not change as a consequence of the DCMM 130. In particular, a store instruction can remain buffered in a processor element 120a until such time as either an ACK or a NACK is received. The receiving of an ACK indicates that the instruction was received-ostensibly by the PCI device 140 but actually by the DCMM 130 of the device 120d to which the PCI bus 170 is connected. A NACK indicates that the instruction has not been received. Again, ostensibly this will have been rejected by the PCI device 140, but in practice the refusal comes from the DCMM 130 of the device 120d to which the PCI bus 170 is connected. Having received the ACK, the instruction can be deleted as having been executed. When the NACK is received, an error can be raised (such as an exception) or the instruction can be re-executed, or other action taken. It will be appreciated that until the ACK/NACK is received, the instruction remains buffered and therefore a limited number of such instructions can be 'in-flight' at once. However, since the ACK/NACK actually come from another device 120d connected in the mesh of devices 120a, 120b, 120c, 120d, the ACK/NACK is returned more quickly than if it came from the PCI device 140. Consequently, although the number of in-flight instructions remains the same (from the perspective of the processor element 120a), the length of time for which they are in-flight is reduced as compared to a situation where the PCI device 140 itself responds.

Although these examples use a credit based system, other examples may provide flow control using a guaranteed bandwidth mechanism. In particular, certain PCI devices 140, or certain processor elements 120 may be guaranteed a certain amount of bandwidth each period. Where that bandwidth would be exceeded, the instruction can be refused via a NACK.

Concepts described herein may be embodied in a system comprising at least one packaged chip. The apparatus 130 described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 5:
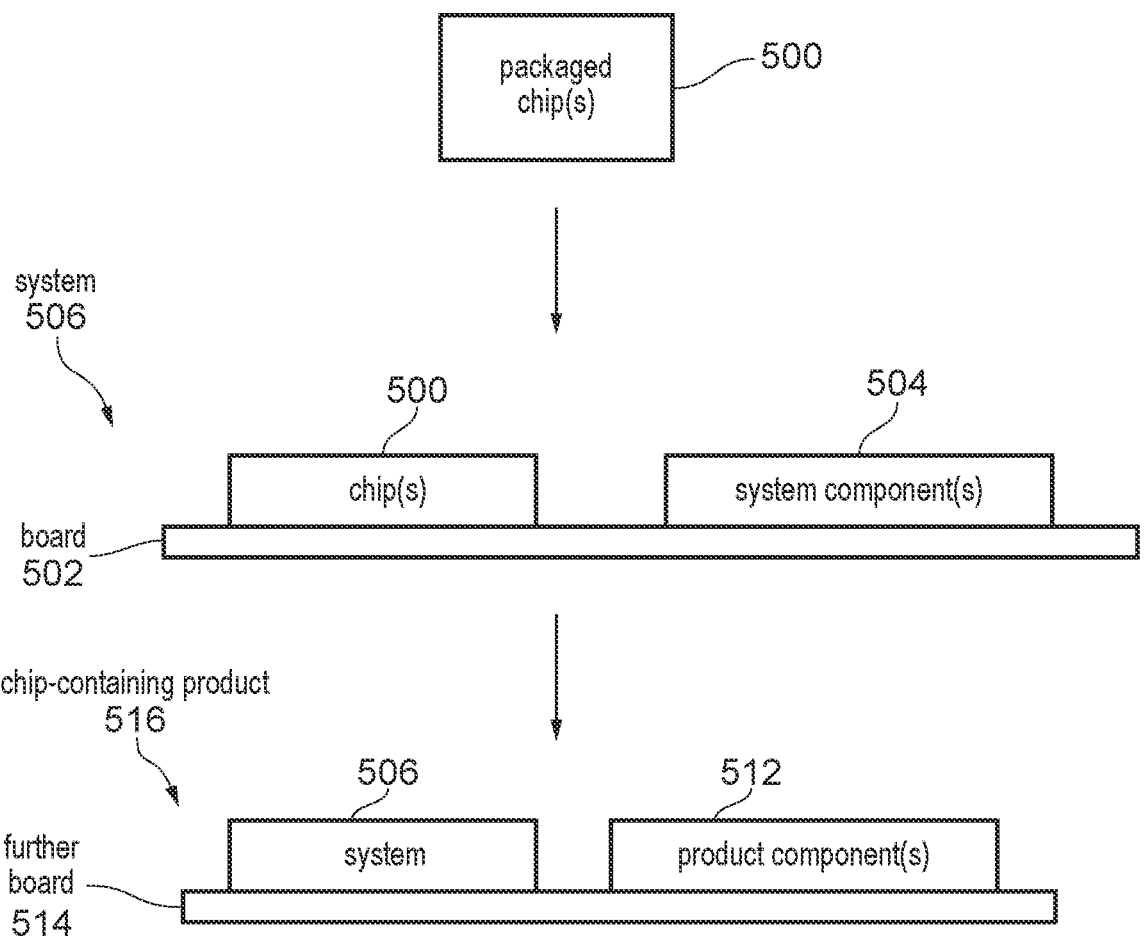
FIG. 5 shows an example implementation of the present technique.

As shown in FIG. 5, one or more packaged chips 500, with the apparatus 130 described above implemented on one chip or distributed over two or more of the chips, are manufactured by a semiconductor chip manufacturer. In some examples, the chip product 500 made by the semiconductor chip manufacturer may be provided as a semiconductor package which comprises a protective casing (e.g. made of metal, plastic, glass or ceramic) containing the semiconductor devices implementing the apparatus 130 described above and connectors, such as lands, balls or pins, for connecting the semiconductor devices to an external environment. Where more than one chip 500 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 500 are assembled on a board 502 together with at least one system component 504 to provide a system 506. For example, the board may comprise a printed circuit board. The board substrate may be made of any of a variety of materials, e.g. plastic, glass, ceramic, or a flexible substrate material such as paper, plastic or textile material. The at least one system component 504 comprise one or more external components which are not part of the one or more packaged chip(s) 500. For example, the at least one system component 504 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 516 is manufactured comprising the system 506 (including the board 502, the one or more chips 500 and the at least one system component 504) and one or more product components 512. The product components 512 comprise one or more further components which are not part of the system 506. As a non-exhaustive list of examples, the one or more product components 512 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 506 and one or more product components 412 may be assembled on to a further board 514.

The board 502 or the further board 514 may be provided on or within a device housing or other structural support (e.g. a frame or blade) to provide a product which can be handled by a user and/or is intended for operational use by a person or company.

The system 506 or the chip-containing product 516 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The present technique could be configured as follows:
1. A data processing apparatus comprising:
   interception circuitry configured to intercept an incoming signal corresponding to an instruction from a processor element to a PCI device;
   respond circuitry configured to provide a response to the incoming signal back to the processor element, wherein the response is either an acceptance of the incoming signal or a refusal of the incoming signal based on a flow control between the data processing apparatus and the PCI device; and
   forward circuitry configured to perform a transmission, to the PCI device, of an outgoing signal corresponding to the command after the response has indicated acceptance of the incoming signal.
2. The data processing apparatus according to clause 1, wherein
   the interception circuitry comprises receive circuitry to receive the incoming signal.
3 The data processing apparatus according to any preceding clause, wherein
   the interception circuitry is configured to intercept the incoming signal based on a destination of the incoming signal.
4 The data processing apparatus according to preceding clause, comprising:
   address range storage circuitry configured to indicate one or more memory ranges used to address the PCI device; and
   the interception circuitry is configured to intercept the incoming signal in dependence on whether a destination address of the command falls within the one or more memory ranges.
5. The data processing apparatus according to clause 4, wherein
   the address range storage circuitry is configured to store, in association with each of the one or more memory ranges, an indication of whether the control flow applies.
6. The data processing apparatus according to any one of clause 4-5, wherein
   the address range storage circuitry is configured to store, in association with each of the one or more memory ranges, an indication of whether the control flow applies for the processor element.
7. The data processing apparatus according to any preceding clause, wherein
   the interception circuitry is configured to receive a plurality of incoming signals corresponding to commands from a plurality of processor elements, including the incoming signal corresponding to the command from the processor element; and
   the plurality of processor elements are connected in a mesh together with the data processing apparatus.
8. The data processing apparatus according to any preceding clause, wherein
   the control flow defines a permitted flow for each of a plurality of PCI devices including the PCI device.
9. The data processing apparatus according to any preceding clause, wherein
   the respond circuitry is configured, in response to the flow control indicating that a maximum flow for the PCI device has been reached, to respond to the command with a NACK.
10. The data processing apparatus according to any preceding clause, wherein
   the flow control is a credit based mechanism.
11. The data processing apparatus according to any preceding clause, wherein
   the respond circuitry is configured to provide the response to the incoming signal back to the processor element prior to the transmission occurring.
12. The data processing apparatus according to any preceding clause, wherein
   the respond circuitry is configured to provide the response in the form of an acknowledgement to the incoming signal back to the processor element prior to the transmission occurring, when a maximum flow for the PCI device is not reached.
13. A method of data processing comprising:
   intercepting an incoming signal corresponding to an instruction from a processor element to a PCI device;
   providing a response to the incoming signal back to the processor element, wherein the response is either an acceptance of the incoming signal or a refusal of the incoming signal based on a flow control between the data processing apparatus and the PCI device; and performing a transmission, to the PCI device, of an outgoing signal corresponding to the command after the response has indicated acceptance of the incoming signal.

14. A non-transitory computer-readable medium to store computer-readable code for fabrication of a data processing apparatus comprising:

interception circuitry configured to intercept an incoming signal corresponding to an instruction from a processor element to a PCI device;

respond circuitry configured to provide a response to the incoming signal back to the processor element, wherein the response is either an acceptance of the incoming signal or a refusal of the incoming signal based on a flow control between the data processing apparatus and the PCI device; and forward circuitry configured to perform a transmission, to the PCI device, of an outgoing signal corresponding to the command after the response has indicated acceptance of the incoming signal.

15. A system comprising:

the data processing apparatus of any preceding clause, implemented in at least one packaged chip;

at least one system component; and a board, wherein the at least one packaged chip and the at least one system component are assembled on the board.

We claim:

1. A data processing apparatus comprising:

interception circuitry configured to intercept an incoming signal corresponding to an instruction from a processor element to a PCI device;

respond circuitry configured to provide a response to the incoming signal back to the processor element, wherein the response is selected from between an acceptance of the incoming signal and a refusal of the incoming signal, based on a flow control between the data processing apparatus and the PCI device; and forward circuitry configured to perform a transmission, to the PCI device, of an outgoing signal corresponding to the command after the response has indicated acceptance of the incoming signal.

2. The data processing apparatus according to claim 1, wherein the interception circuitry comprises receive circuitry to receive the incoming signal.

3. The data processing apparatus according to claim 1, wherein the interception circuitry is configured to intercept the incoming signal based on a destination of the incoming signal.

4. The data processing apparatus according to claim 1, comprising:

address range storage circuitry configured to indicate one or more memory ranges used to address the PCI device; and the interception circuitry is configured to intercept the incoming signal in dependence on whether a destination address of the command falls within the one or more memory ranges.

5. The data processing apparatus according to claim 4, wherein the address range storage circuitry is configured to store, in association with each of the one or more memory ranges, an indication of whether the control flow applies.

6. The data processing apparatus according to claim 4, wherein the address range storage circuitry is configured to store, in association with each of the one or more memory ranges, an indication of whether the control flow applies for the processor element.

7. The data processing apparatus according to claim 1, wherein the interception circuitry is configured to receive a plurality of incoming signals corresponding to commands from a plurality of processor elements, including the incoming signal corresponding to the command from the processor element; and the plurality of processor elements are connected in a mesh together with the data processing apparatus.

8. The data processing apparatus according to claim 1, wherein the control flow defines a permitted flow for each of a plurality of PCI devices including the PCI device.

9. The data processing apparatus according to claim 1, wherein the respond circuitry is configured, in response to the flow control indicating that a maximum flow for the PCI device has been reached, to respond to the command with a NACK.

10. The data processing apparatus according to claim 1, wherein the flow control is a credit based mechanism.

11. The data processing apparatus according to claim 1, wherein the respond circuitry is configured to provide the response to the incoming signal back to the processor element prior to the transmission occurring.

12. The data processing apparatus according to claim 1, wherein the respond circuitry is configured to provide the response in the form of an acknowledgement to the incoming signal back to the processor element prior to the transmission occurring, when a maximum flow for the PCI device is not reached.

13. A method of data processing comprising:

intercepting, using interception circuitry, an incoming signal corresponding to an instruction from a processor element to a PCI device;

using response circuitry to provide a response to the incoming signal back to the processor element, wherein the response is selected from between an acceptance of the incoming signal and a refusal of the incoming signal, based on a flow control between the data processing apparatus and the PCI device; and performing a transmission using forward circuitry, to the PCI device, of an outgoing signal corresponding to the command after the response has indicated acceptance of the incoming signal.

14. A non-transitory computer-readable medium to store computer-readable code for fabrication of a data processing apparatus comprising:

interception circuitry configured to intercept an incoming signal corresponding to an instruction from a processor element to a PCI device;

respond circuitry configured to provide a response to the incoming signal back to the processor element, wherein the response is selected from between an acceptance of the incoming signal and a refusal of the incoming signal, based on a flow control between the data processing apparatus and the PCI device; and forward circuitry configured to perform a transmission, to the PCI device, of an outgoing signal corresponding to the command after the response has indicated acceptance of the incoming signal.

15. A system comprising:

the data processing apparatus of claim 1, implemented in at least one packaged chip;

at least one system component; and a board, wherein the at least one packaged chip and the at least one system component are assembled on the board.

* * * * *